Oct. 27, 1936.  W. J. HALL  2,058,867
HOOD CONSTRUCTION
Filed Oct. 4, 1935
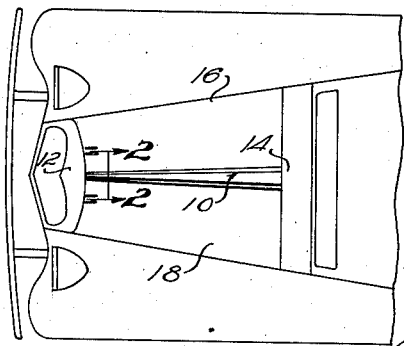
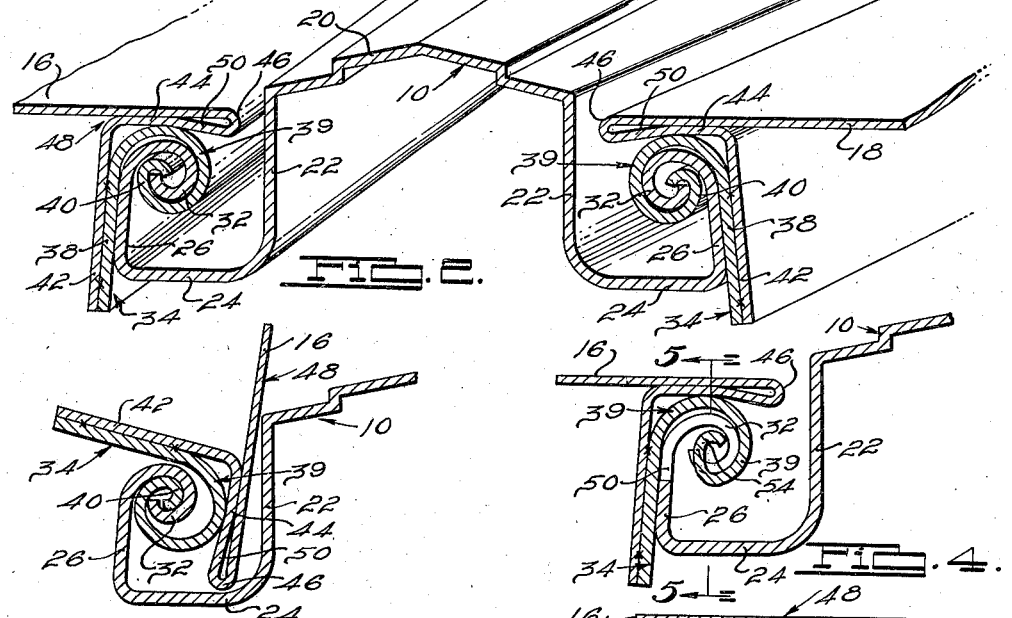
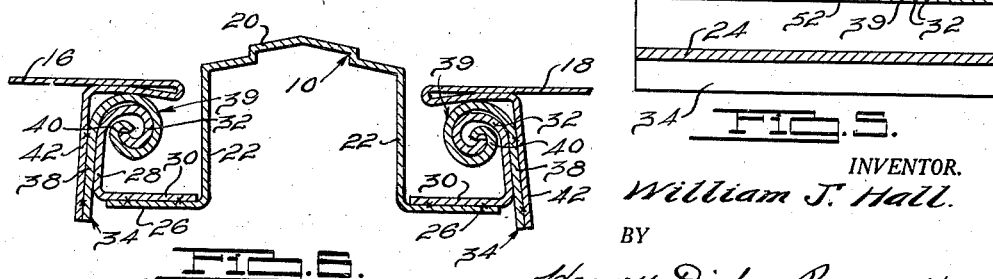
INVENTOR.
William J. Hall.
BY
Harness, Dickey, Pierce & Hann.
ATTORNEYS.

Patented Oct. 27, 1936

2,058,867

UNITED STATES PATENT OFFICE 2,058,867

HOOD CONSTRUCTION

William J. Hall, Detroit, Mich., assignor, by mesne assignments, of thirty per cent to Ollie L. Herron, thirty per cent to Joseph B. Zimmers, thirty-three per cent to William J. Hall, and seven per cent to R. C. Schemmel Application October 4, 1935, Serial No. 43,494

8 Claims. (Cl. 180—69.01)

The invention relates to improvements in hood constructions and it has particular relation to the manner of hinging parts of the hood together, and to an automobile body.

In certain respects the invention relates to that disclosed in United States Letters Patent No. 1,987,774, issued to me January 15, 1935, for a Hood construction.

An object of the invention is to provide a hood construction wherein the hinged portion is concealed from view and is protected from rain and other elements which would cause rust or deterioration thereof.

Another object of the invention is to provide a hinged relation between the wing members of a hood whereby water draining from the hood is prevented from dripping upon the motor, by it being caught and removed to the end of the hood and from there either permitted to fall harmlessly and free of the motor or be otherwise suitably discharged.

Another object of the invention is to provide an improved hood having hinged wings which may be raised and lowered simultaneously without interfering with each other.

Another object of the invention is to provide an improved hood construction wherein the exposed and finished surfaces will not ordinarily come in contact with each other during movement of the component parts.

Another object of the invention is to provide a hood construction accomplishing the above objects, which enhances the appearance of a vehicle.

Another object of the invention is to provide a hood construction accomplishing the above objects, which is simple in construction, efficient and effective in use, and inexpensive to manufacture.

Other objects of the invention will be apparent from the following description, the drawing relating thereto and from the claims hereinafter set forth.

In the accompanying drawing:

Fig. 1 is a fragmentary plan view of an automobile having a hood constructed according to one form of the invention;

Fig. 2 is an enlarged sectional view, partly in perspective, taken on line 2—2 of Fig. 1;

Fig. 3 is a cross sectional view of one of the hinged constructions shown in Fig. 2, showing the relative position of the parts thereof when the hood wing is raised;

Fig. 4 is a cross sectional view of the hinged section taken adjacent the ends thereof;

Fig. 5 is a vertical section of the end portion of the hinged section taken on line 5—5 of Fig. 4;

Fig. 6 is a cross sectional view similar to that shown in Fig. 2 showing another form of the invention.

Referring now, in further detail to Fig. 1 of the drawing, an elongated fixed, central member 10 is provided which is terminally secured to the radiator 12 and the cowl 14 of an automobile. This hood member 10 is constructed principally of sheet metal and constitutes a hinged support for hood wings 16 and 18 which are constructed and hingedly mounted in a symmetrically opposed manner upon opposite sides of the central member 10.

Referring to Fig. 2, the member 10 comprises a substantially wide top portion 20 of a roof-like cross sectional configuration having a suitable finish to enhance the appearance of an automobile. At each edge of the top portion 20, the central member 10 is provided with downwardly, outwardly and upwardly directed flanges 22, 24 and 26 respectively, forming a U-shaped trough-like structure, along and depending from the side edges of the top portion 20. Each upper edge of the flanges 26 is reversely beaded in a spiral manner, inwardly, and toward the adjacent flange 22 to form a male member 32 of a nested hinge which is more specifically described in my Patent No. 1,987,774, mentioned above.

The female member 34 of the nested hinge may be formed separately and apart from the male member 32 and comprises a flat portion 38 and a curved portion 39. The latter's inner face is substantially and concentrically spiral with the outer face of the male member 32 when the flat portion 38 thereof is in a position abutting the flange 26. The female member 34 is provided at its spiralled edge with a hook-shaped portion 40 curled to fit around the inner edge of the male member to prevent lateral disengagement and rattling of the two members when the wing is in a closed position, and to serve as a stop to hinging movement although this limiting action is resiliently effected through "give" in the hinge.

The hood wings 16 and 18 may be secured in any suitable manner, preferably by welding, to the female members 34 on the outer faces of the flat portions 38 thereof, with the edges 42 of the wings extending downwardly and substantially coextensively with the depending edges of the flat portions 38. That portion of the wings which extends upwardly beyond the top of the curved portion 39 of the female member 34 is suitably bent inwardly and over the adjacent nested hinge to form a flanged portion 44 covering the hinge and the U-shaped channel. Then, at a line parallel to the edges of the top portion 10 and proximate thereto, the wings 16 and 18, respectively, are reversely doubled upon the flanges 44 in a manner providing a rounded edge 46 upon each wing member adjacent and parallel to the edges of the top portion 10 and providing an otherwise conventional hood construction. The exposed portion 48 of the hood wings 16 and 18 may be formed or finished with respect to the top portion 20 of the central member 10 in any suitable manner to enhance the appearance of the automobile hood assembly.

Attention is directed to the fact that a portion 50 of the flange 44 of the hood member may be provided in a plane declining from a point immediately above the nearest portion of the female member 34, and, continuing to the edge 46 in a manner, to provide a downwardly sloping under surface whereby the water draining off of a hood wing 16 or 18 is caused to drip into the U-shaped channel portions of central member 10 without touching the hinge, thus preventing any water which passes down over the edge 46 from clinging to the lower face of 44 and following it back towards and into the hinge structure.

From the description thus far, it will be seen that the hinge operates in the following manner: From a position, wherein the flat portion 38 of female member 34 abuts the outer face of flange 26 of the central element 10, and, wherein the hook portion 40 of the female member is curled around the edge of a curved portion 32 of the central members and the inner face of the spirally curved portion of the female member 38 substantially coincides with the outer face of the curved male portion 32, the female member 38 may be moved away from an abutting relation with flange 26 to a position substantially as disclosed in Fig. 3 where the outer face of the hook portion 40 fits snugly against the inner face of the male member 32, thereby preventing further relative movement of the parts. Reversing this movement of the female member 34, the first position may be returned to. In this manner, the pivotal movement between the two members is limited between two positions in the hinge construction itself.

In this connection it will be seen that the limiting positions are such that when the hood wing 16 is closed, a snug and rattle proof engagement is provided, and when the hood wing is raised the edge 46 and face 48 of the hood wing do not scratch against or contact the adjacent portions 24 and 22 respectively of the central member 10. However, if desired, the pivotal movement of the hinge construction may be further limited between the two above mentioned positions by extending the flange 44 until the edge 46 thereof contacts flange 24 at a predetermined position of the pivotally moved hinge elements.

It will be apparent from the above that the male and female parts of the hinge are so designed that when assembled together by sliding the male section into the female section, a smooth working shake proof hinge results, which may at no time during the whole working range of pivotal movement permit contact between the visible parts of the hood construction and, further, the hinge parts are so constructed and arranged that they cannot be disengaged except in precisely the same manner as that in which they are assembled.

Referring now to Figs. 4 and 5, it will be seen that a longitudinal disassembly of the male and female members 32 and 39 respectively, may be prevented by a portion of the male member 32 being removed and the female member 39 inwardly distorted from its concentrically spiral shape over a portion thereof coextensive with the removed portion of the male member in a manner providing a longitudinal abutting relation between the edge 50 of the remaining portion 32 of the male member and the opposing edge 52 of the distorted portion 54 of the female member.

The U-shaped trough-like structure formed by the flanges 22, 24, and 26 serves the following purposes: Receive the edge of the wing 16 when such is raised, as hereinbefore described; catch water draining from the top portion 20; and, convey such water to the end of the central member 10, where it may either fall harmlessly free of the motor or be suitably discharged without touching the motor or other parts housed under the hood construction.

The outwardly directed flange 24 in Fig. 2 may be modified as disclosed in Fig. 6, where the upwardly directed flange 26 shown in Fig. 2 is absent and an L-shaped structure having a vertical portion 28 and a horizontal portion 30 is substituted. This L-shaped structure is secured to the central member 10 by a welded face to face contact between the horizontal portion 30 of the L-shaped structure, and the horizontal flange 26 of the central member 10. Other suitable securing means, such as riveting or the like, may be substituted for the welding suggested in connection with this structure.

It is apparent from the above that a novel hinge construction is provided which will operate easily and smoothly without opportunity of disengaging and without rattling. Moreover it is apparent that an invisible hinge construction has been provided for a hood which assures preservation of the exposed and finished surfaces of the hood by eliminating any possibility of a scratching or other marring of the exposed surface during the pivotal movement of the component parts of the hinge. It is also apparent that a novel form of hinge construction is provided wherein the nested hinge portion is concealed from view and protected from rain and other elements which cause rust or other deterioration. Furthermore, it is apparent that the hinge can be constructed efficiently and inexpensively by rolling the metal into the form described, and the hinge parts readily assembled and protected against disassembly, and it is also apparent that a novel hinge construction is provided which prevents water on the hood from dropping through on the motor and the parts housed under the hood.

Although preferred embodiments of the present invention have been shown and described herein, it will be apparent that it is capable of various uses, modifications and changes and accordingly, formal changes may be made therein without departing from the substance of the broad invention, the scope of which is commensurate with the appended claims.

What is claimed is:

1. In a hood construction for motor vehicles comprising, an elongated central hood member, a pair of plate members disposed one along each side of the hood member, said hood member and said plates having turned beads on adjacent edges and one nested within the other in a hinged relation, said inner bead having a portion thereof removed and said outer bead being inwardly offset co-extensively with said removed portion to provide a longitudinally abutting relation between the beads, said hood member having an upwardly opening U-shaped channel subjacent each side, and a hood wing secured to each of the plate members.

2. In a hood construction for motor vehicles, an elongated central hood member having an upwardly open channel at each edge, the outer leg of each channel terminating at its upper edge in an inwardly and then downwardly curved portion defining a hinge part, a second hinge part having a curved portion receiving the curved portion of the first hinge part and extending downwardly along the outer channel leg when the hinge parts are in one position, and a hood wing having a flange portion secured to said downwardly extending portion of the second hinge part.

3. In a hood construction for motor vehicles, an elongated central hood member having an upwardly open channel at each edge, the outer leg of each channel terminating at its upper edge in an inwardly and then downwardly curved portion defining a hinge part, a second hinge part having a curved portion receiving the curved portion of the first hinge part and extending downwardly along the outer channel leg when the hinge parts are in one position; and a hood wing extending above and over each hinge and then being reversely bent along its lower side and then terminating in a downwardly directed flange secured to the downwardly extending portion of the second hinge part.

4. In a hood construction for motor vehicles, an elongated central hood member having an upwardly open channel at each edge, the outer leg of each channel terminating at its upper edge in a turned bead providing a hinge part, a plate member extending along the outer side of the outer leg of said channel and having a turned bead at its upper edge hingingly interengaging the curved bead of the first hinge part, and a hood member having a downwardly directed flange at its inner edge, extending along said plate member and being secured thereto.

5. In a hood construction for motor vehicles, an elongated central hood member having an upwardly open channel at each edge, the outer leg of each channel terminating at its upper edge in a turned bead providing a hinge part, a plate member extending along the outer side of the outer leg of said channel and having a turned bead at its upper edge hingingly interengaging the curved bead of the first hinge part, and a hood member extending over the hinge and being reversely bent along its under side and terminating in a downwardly directed flange secured to the plate member.

6. In a hood construction for motor vehicles, an elongated central hood member having an upwardly open channel at each edge, the outer leg of each channel terminating at its upper edge in a turned bead providing a hinge part, a plate member extending along the outer side of the outer leg of said channel and having a turned bead at its upper edge hingingly interengaging the curved bead of the first hinge part, and a hood member having a downwardly directed flange at its inner edge, extending along said plate member and being secured thereto, said plate member, flange on the hood member, and outer leg of the channel, being substantially parallel and having their adjacent sides substantially abutting when the hinge is in one position.

7. In a hood construction for motor vehicles, an elongated hood member having an upwardly open channel at one edge, the outer leg of said channel terminating at its upper edge in an inwardly and then downwardly curved portion defining a hinge part, a second hinge part having a curved portion receiving the curved portion of the first hinge part and extending downwardly along the outer channel leg when the hinge parts are in one position, and a hood wing having a flange portion secured to said downwardly extending portion of the second hinge part.

8. In a hood construction for motor vehicles, an elongated hood member having an upwardly open channel at one edge, the outer leg of said channel terminating at its upper edge in a turned bead providing a hinge part, a plate member extending along the outer side of the outer leg of said channel and having a turned bead at its upper edge hingingly interengaging the curved bead of the first hinge part, and a hood member having a downwardly directed flange at its inner edge extending along said plate member and being secured thereto.

WILLIAM J. HALL.